US005544021A

United States Patent [19]

Lopez et al.

[11] Patent Number: 5,544,021

[45] Date of Patent: Aug. 6, 1996

[54] MOTOR VEHICLE HEADLIGHT INCLUDING A TWO-FILAMENT LAMP FOR SELECTIVELY GENERATING A MAIN BEAM AND AN ANTI-FOG BEAM

[75] Inventors: François Lopez, Bondy; Etienne Pauty, Paris; Norbert Brun, Guermantes, all of France

[73] Assignee: Valeo Vision, Bobigny, France

[21] Appl. No.: 99,239

[22] Filed: Jul. 29, 1993

[30] Foreign Application Priority Data

Jul. 30, 1992 [FR] France .................................. 92 09456

[51] Int. Cl.$^6$ .................................................. B60Q 1/04

[52] U.S. Cl. ........................... 362/61; 362/211; 362/214; 362/297

[58] Field of Search ............................ 362/61, 211, 214, 362/297, 346, 347, 310

[56] References Cited

U.S. PATENT DOCUMENTS

| | | | |
|---|---|---|---|
| 390,278 | 4/1933 | Dicker | 362/214 |
| 4,276,583 | 6/1981 | Fratty | 362/214 |

FOREIGN PATENT DOCUMENTS

| | | | |
|---|---|---|---|
| 1299552 | 1/1962 | France | 362/346 |
| 1400370 | 4/1965 | France | 362/211 |
| 2362336 | 3/1978 | France . | |
| 2536503 | 5/1984 | France . | |
| 0015950 | 4/1956 | Germany | 362/211 |
| 3533117 | 3/1987 | Germany . | |
| 0045987 | 4/1979 | Japan | 362/211 |

*Primary Examiner*—Denise L. Gromada
*Assistant Examiner*—Y. Quach
*Attorney, Agent, or Firm*—McCormick, Paulding & Huber

[57] ABSTRACT

A motor vehicle headlight of the type comprising a two-filament lamp in which a first filament is provided with a cup so as to allow light to pass over a given angular extent only, and in which a second filament has no such cup, the headlight further comprising a closure glass and a reflector suitable for co-operating with one or the other of the two filaments respectively for generating an anti-fog beam and a main beam. According to the invention, the reflector comprises a reflecting surface having a first zone whose extent corresponds at least approximately to said given angular extent and whose shape is such that it generates, on its own, images of the first filament in which all of the points of the images lie below a cutoff that extends generally horizontally, thereby forming the anti-fog beam, and a second zone that runs continuously into the first zone, said first and second zones co-operating with the second filament to form the main beam.

5 Claims, 2 Drawing Sheets

MOTOR VEHICLE HEADLIGHT INCLUDING A TWO-FILAMENT LAMP FOR SELECTIVELY GENERATING A MAIN BEAM AND AN ANTI-FOG BEAM

The present invention relates to motor vehicle headlights, and it relates in particular to headlights of the type including a two-filament lamp, such as a standardized "H4" type lamp, a reflector designed to cooperate with each of the two filaments to generate two beams of respective given configurations, and finally a closure glass.

BACKGROUND OF THE INVENTION

It is already known that, by switching between the filaments, an "H4" type lamp or the like can be used in a single headlight to form either a main beam or an anti-fog beam. In this respect, it is recalled that the design purpose of an H4 lamp is to enable a headlight fitted with such a lamp disposed in association with a parabolic type reflector to produce either a main beam or else a dipped beam that is delimited by a "European" cutoff whose outline is in the form of a flattened V-shape. To this end, the H4 lamp includes two axial filaments, with the front one of the filaments being provided with an occulting cup. The filament associated with the cup co-operates with a parabolic reflector to form a dipped beam whose cutoff profile is determined by the geometry of the cup. The disposition of the front filament F and of the cup C is shown in FIG. 1*a* of the drawings. The angle $\alpha$ determines the angle at which the sloping portion of the cutoff rises, as shown in FIG. 2*a*.

Conventionally, a main beam and anti-fog beam headlight of this type includes the above-mentioned "H4 " lamp, a reflector, and a glass. In this case, the lamp is not disposed in the manner intended for obtaining a main/dipped beam headlight, but is angularly offset by $\alpha/2$ for reasons of symmetry that are explained below. The position of the front filament F and of the cup C is illustrated in FIG. 1*b*.

In a first known embodiment, the reflector is constituted by two half-paraboloids with the boundary between them being constituted by a horizontal plane that includes the optical axis, the two half-paraboloids being focused respectively on the filament associated with a cup and on the filament without a cup so as to form the anti-fog beam and the main beam, respectively.

A drawback of that known headlight lies in the existence of a step in the reflector between its upper and lower surfaces, said step giving rise firstly to optical anomalies in the resulting beams and secondly to difficulties to manufacturing the reflector, regardless of whether manufacture is by stamping metal sheet or by molding plastics material, with these difficulties including difficulties of varnishing the reflecting surface.

Another known solution for making the reflector consists in using a single paraboloid which is focused on the filament that is associated with the cup. This solution may indeed mitigate the above-mentioned drawbacks, but in order to obtain a main beam with adequate concentration on the optical axis, it becomes necessary to fit the reflector with a system of prisms for ensuring proper refocusing of the main beam.

Finally, and above all, a drawback which is common to both known solutions lies in it being impossible to obtain an anti-fog beam with a horizontal cutoff as is generally desired. More precisely, the very design of the occulting cup which extends over an angle of only 165° around the corresponding filament causes the resulting anti-fog beam to have a symmetrical V-shaped cutoff, with a large quantity of light escaping over the horizontal. The general shape of the resulting beam is shown in FIG. 2*b*.

OBJECT AND SUMMARY OF THE INVENTION

The invention seeks to mitigate these drawbacks of the prior art.

To this end, the invention provides a motor vehicle headlight of the type comprising a two-filament lamp in which a first filament is provided with a cup so as to allow light to pass over a given angular extent only, and in which a second filament has no such cup, the headlight further comprising a closure glass and a reflector suitable for co-operating with one or the other of the two filaments respectively for generating an anti-fog beam and a main beam, wherein the reflector comprises a reflecting surface having a first zone whose extent corresponds at least approximately to said given angular extent and whose shape is such that it generates, on its own, images of the first filament in which all of the points of the images lie below a cutoff that extends generally horizontally, thereby forming the anti-fog beam, and a second zone that runs continuously into the first zone, said first and second zones co-operating with the second filament to form the main beam.

BRIEF DESCRIPTION OF THE DRAWINGS

Other aspects, objects, and advantages of the present invention appear more clearly on reading the following detailed description of a preferred embodiment of the invention given by way of example and made with reference to the accompanying drawings, in which.

MORE DETAILED DESCRIPTION

Figure 3:
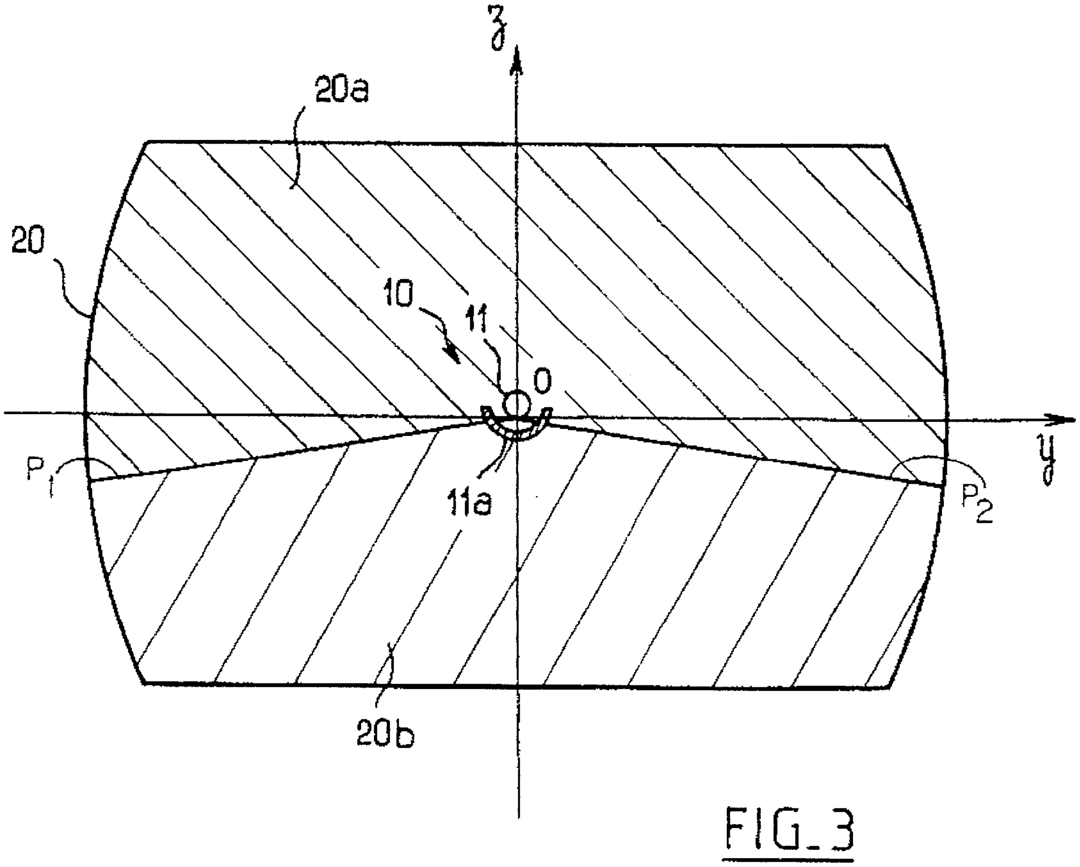
FIG. 3 is a front view of a lamp and reflector assembly for a main/anti-fog headlight constituting a first embodiment of the invention.
Figure 4:
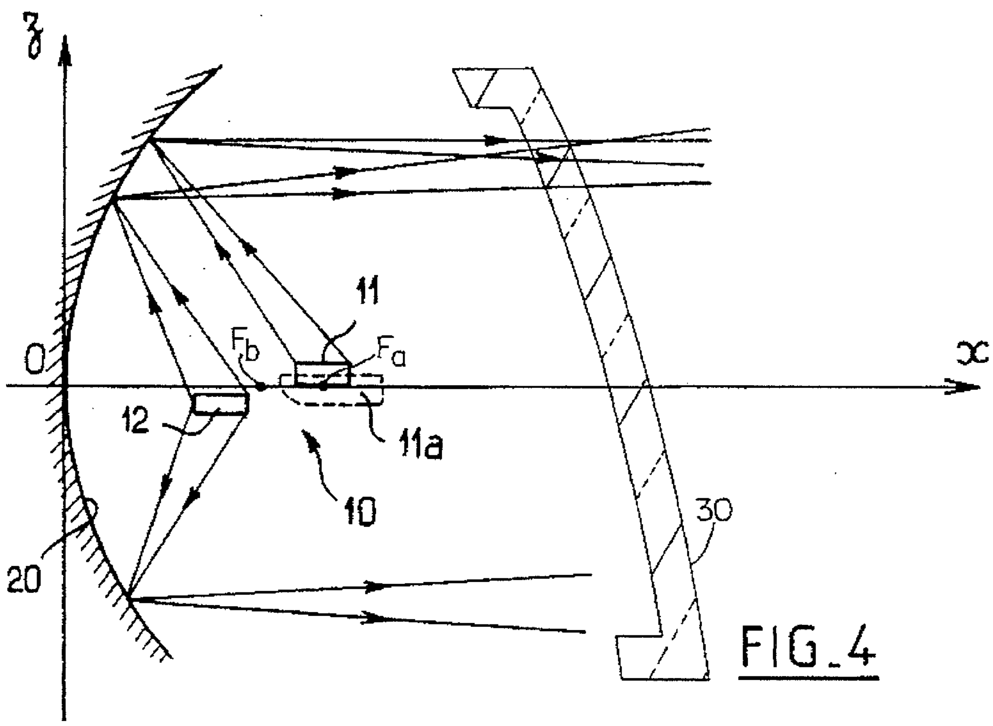
FIG. 4 is an axial horizontal section view through the FIG. 3 headlight.
Figure 5:
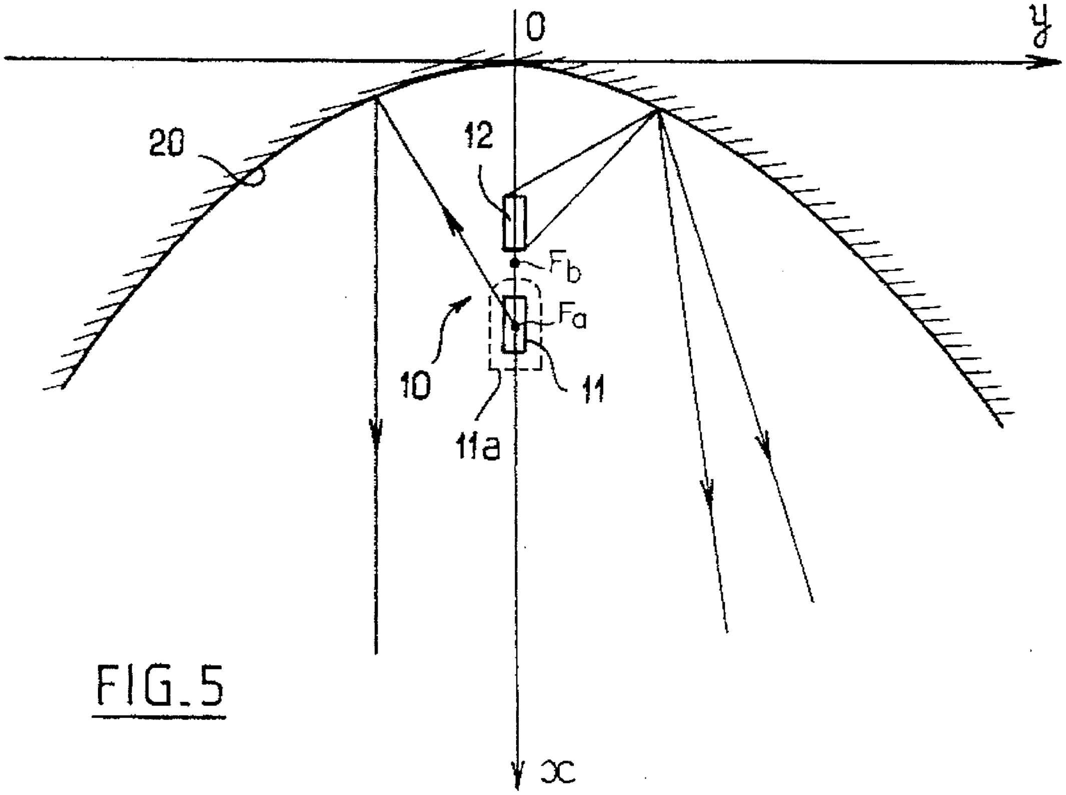
FIG. 5 is an axial vertical section view through the headlight of FIGS. 3 and 4.

As a preliminary point, it should be observed that in FIGS. 3 to 5, the sizes of the filaments and also the inclinations of the generated or reflected light rays are exaggerated for reasons of clarity.

With reference to FIGS. 3 to 5, there can be seen a main/anti-fog headlight for a motor vehicle, the headlight comprising a lamp 10, a reflector 20, and a front closure glass 30.

In this case, the lamp is a standardized "H4" lamp comprising a first filament 11 associated with an occulting cup 11*a*, and a second filament 12 that is not associated with such a cup. The filament 11 that is associated with the cup is situated in front of the other filament 12, both filaments being generally cylindrical about respective axes that are parallel to an optical axis of the headlight referenced Ox. These two filaments are vertically offset relative to each other, with the filament 11 being situated immediately above the axis Ox so as to be tangential thereto, while the filament 12 is situated entirely below the axis Ox.

Figure 1A:
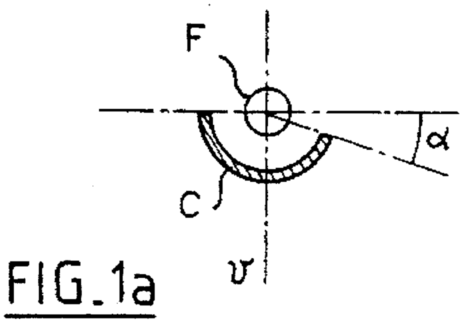
FIGS. 1*a* and 1*b* are diagrammatic front views of the filament of an H4 lamp that is associated with a cup respectively in a conventional position for a main/dipped beam headlight and in a position for a main/anti-fog beam headlight.
Figure 1B:
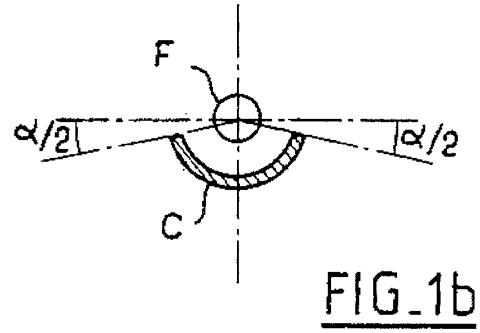
Figure 2A:
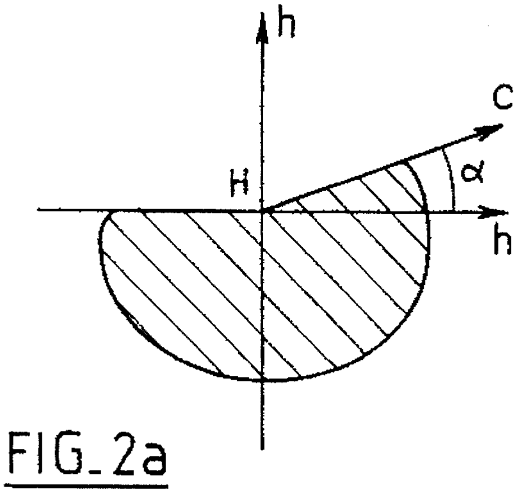
FIGS. 2*a* and 2*b* are diagrams showing the outlines of the dipped beam and of the anti-fog beam obtained with headlights fitted with lamps disposed as shown in FIGS. 1*a* and 1*b* respectively.
Figure 2B:
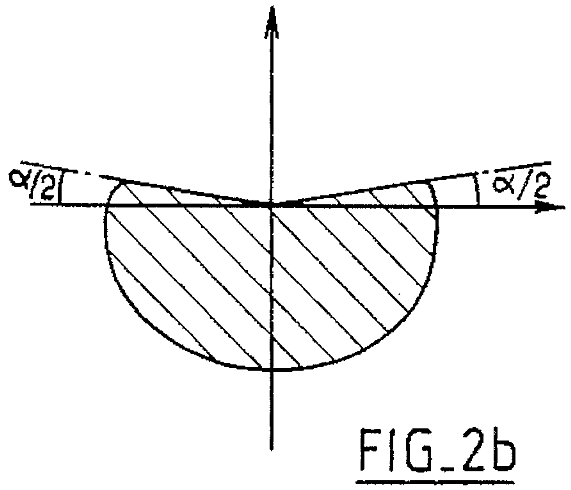

In addition, the lamp 10 extends in such a direction that the cup 11*a* is disposed as shown in FIG. 1*b*, i.e. it allows light to pass symmetrically on either side over an angular extent of 97.5° about an upwardly extending vertical passing through the filament.

The reflector 20 may be made, for example, by molding a plastics material, and it includes a reflecting surface which is provided in this case with two zones 20*a* and 20*b*.

The reflecting surface of each zone is defined, for example, in a system of Cartesian coordinates (O, x, y, z) in which O corresponds to the back of the reflector, Ox constitutes the optical axis, Oy is a horizontal direction perpendicular to the optical axis, and Oz is the vertical direction.

The upper surface 20*a* of the reflector is designed to co-operate with the filament 11 associated with the cup for the purpose of generating an anti-fog beam. In particularly preferred manner, the surface 20*a* is made in accordance with the teaching of French patent application FR-A-2 536 503, the contents of which is incorporated in the present description by reference, and in particular it is made in accordance with the equation given on page 4 of the description of that patent application.

It is merely recalled that such a surface which can be defined mathematically by an equation in (x, y, z) takes into account, in particular, the position, the diameter, and the length of the filament 11, and also a base focus referenced Fa, thereby serving to generate images of the filament 11 that are all situated beneath a horizontal cutoff, and in an optimum embodiment of said surface, the images that are generated all have their topmost points situated in the vicinity of said cutoff.

In a manner that is likewise conventional per se, the base focus Fa is disposed on the axis Ox, preferably in the vicinity of the filament 11 in the direction of said axis.

Preferably, the extent of surface portion 20*a* corresponds at least approximately to the extent covered by the radiation from the filament 11 that is associated with a cup. Concretely, the zone 20*a* is delimited by two half-planes P1 and P2 including the optical axis Ox and symmetrically inclined thereabout through an angle of 7.5° below the horizontal, in correspondence with the disposition of the cup 11*a*.

Thus, when the front filament 11 is on, the reflector and lamp assembly forms a beam that is delimited by a horizontal cutoff. In which case the glass 30 includes in conventional manner (not shown) prisms and/or stripes for spreading the light from the reflector horizontally so as to obtain a properly spread anti-fog beam.

Particularly when the transition between the zones 20*a* and 20*b* does not take place along planes P1 and P2, but instead takes place along the horizontal plane xOy, it may also happen that a certain amount of light is emitted above the horizontal cutoff from those portions of the desired zone 20*a* that are situated between the plane xOy and the planes P1 and P2. Under such circumstances, prisms or the like are disposed in corresponding regions of the glass for the purpose of deflecting said light downwards at least as far as the horizontal.

Given the small angle of the transition planes P1 and P2, it is assumed below, to a first approximation, that the section of the surface 20*a* in said planes is a parabola focused on the focus Fa.

In the present example, the zone 20*b* of the reflector includes a surface of the same surface shape as the zone 20*a*, which has the same horizontal generator line, but whose base focus determining a base focus Fb is different from that of the zone 20*a*. For example, the base focus Fb may be situated on the optical axis Ox in the vicinity of the filament 12.

As a result, a reflecting surface is obtained that has practically no discontinuity (step) nor any sudden change of slope at the transition between the zones 20*a* and 20*b* in the planes P1 and P2.

Both of the zones 20*a* and 20*b* are exposed to the light radiation from the rear filament 12 for generating a main beam.

Thus, a headlight of the present invention makes it possible to use a standardized "H4" type lamp or the like in association with a reflector of appropriate design selectively to generate an anti-fog beam whose cutoff is no longer determined by the geometry of the cup 11*a* by virtue of the characteristics explained above, such that the cutoff may therefore be horizontal.

More precisely, it is observed that unlike the practice in the prior art where the cup 11*a* associated with the filament 11 plays a fundamental role in forming the cutoff of the anti-fog beam, in this case the cup 11*a* has no effect in determining said cutoff, given that the surface 20*a* of the reflector 20 is itself sufficient for generating the cutoff by appropriate positioning of the images formed. The cup 11*a* thus serves solely to prevent radiation from the filament 11 being directed to those portions of the reflecting surface (in this case the zone 20*b*) which are unsuitable of themselves for forming any kind of cutoff.

Naturally, the present invention is not limited to the embodiment described above and shown in the drawings, and the person skilled in the art will be capable of making variants or modifications that come within the spirit of the invention.

We claim:

1. A motor vehicle headlight of the type comprising a two-filament lamp in which a first filament is provided with a cup so as to allow light to pass over a given angle substantially greater than 180° and delimited by two half-planes each inclined relative to and to a similar degree beneath an imaginary horizontal line, and in which a second filament has no such cup, the headlight further comprising a closure glass and a non-parabolic reflector suitable for co-operating with the first and second filaments for generating respectively an anti-fog beam and a main beam, wherein the reflector comprises a reflecting surface having a first zone whose extent corresponds at least approximately to said given angle and whose shape is such that it generates, on its own and independently of cup shape, images of the first filament in which all of the points of the images lie below a horizontal cutoff, thereby forming the anti-fog beam, and a second zone that runs continuously into the first zone, said first and second zones cooperating with the second filament to form the main beam.

2. A headlight according to claim 1, in which the cup is symmetrically disposed relative to an axial vertical plane of the headlight so as to define said given angle essentially delimited by two half-planes each sloping by an equal small angle beneath an imaginary horizontal line, wherein the transition between the first and second zones of the reflecting surface takes place.

3. A headlight according to claim 2, wherein said first zone has a first base focus situated in the vicinity of the first filament and wherein said second zone has a second base focus situated at a distance from said first base focus.

4. A headlight according to claim 3, wherein said second base focus is situated between the first base focus and the reflector.

5. A motor vehicle headlight of the type comprising a two-filament lamp in which a first filament is provided with a cup so as to allow light to pass over a given angle substantially greater than 180° and delimited by two half-planes each inclined relative to and to a similar degree beneath an imaginary horizontal line, and in which a second filament has no such cup, the headlight further comprising a closure glass and a non-parabolic reflector suitable for co-operating with the first and second filaments for generating respectively an anti-fog beam and a main beam, wherein the reflector comprises a reflecting surface having a first zone whose extent corresponds at least approximately to said given angle and whose shape is such that it generates, on its own and independently of cup shape, images of the first filament in which all of the points of the images lie below a horizontal cutoff with the highest points of the images in the vicinity of the cut off, thereby forming the anti-fog beam, and a second zone that runs continuously into the first zone, said first and second zones cooperating with the second filament to form the main beam.

* * * * *